United States Patent [19]

Fassett et al.

[11] 4,191,420
[45] Mar. 4, 1980

[54] PORTABLE CHAIR AND STORAGE UNIT

[76] Inventors: Kendall G. Fassett, Rte. 1, Box 317; Jeffery G. Norris, Box 317, both of, New Lisbon, Wis. 53950

[21] Appl. No.: 932,780

[22] Filed: Aug. 11, 1978

[51] Int. Cl.² .......................... A47C 7/62; A47C 4/00
[52] U.S. Cl. .................................. 297/194; 297/17; 297/183; 297/192; 312/235 R
[58] Field of Search ............... 297/194, 183, 217, 118, 297/378, 380, 17, 192; 312/10, 235 R, 235 A

[56] References Cited

U.S. PATENT DOCUMENTS

| 811,475 | 1/1906 | Bradley | 297/194 X |
|---|---|---|---|
| 1,403,543 | 1/1922 | Daniel | 297/194 X |
| 1,702,955 | 2/1929 | Zaday | 297/194 X |
| 2,127,819 | 8/1938 | Jones | 297/194 X |
| 2,705,994 | 4/1955 | Stattler | 297/378 X |
| 3,179,465 | 4/1965 | Roberts | 297/183 X |
| 3,594,039 | 7/1971 | Harp | 297/378 X |
| 3,713,716 | 1/1973 | Stenger | 312/10 X |

Primary Examiner—James T. McCall

[57] ABSTRACT

An improved chair and storage unit is provided, which is particularly suitable for use as a fishing seat and storage means for fishing equipment. A chair seat is supported on a foundation that includes a first and a second side compartment that flank the seat. The side compartments form arm rests or side tables for the seat, and open along their tops, outwardly of the seat, so as to be readily accessible to a seated person. The seat has a bottom cushion and an adjustable back cushion that compacts to form a portable box-like structure with the other portions of the unit. Storage areas for bait and tackle are provided in one side compartment. The other side compartment has a cooler. An elongate storage area for fish rods and reels is also provided.

9 Claims, 7 Drawing Figures

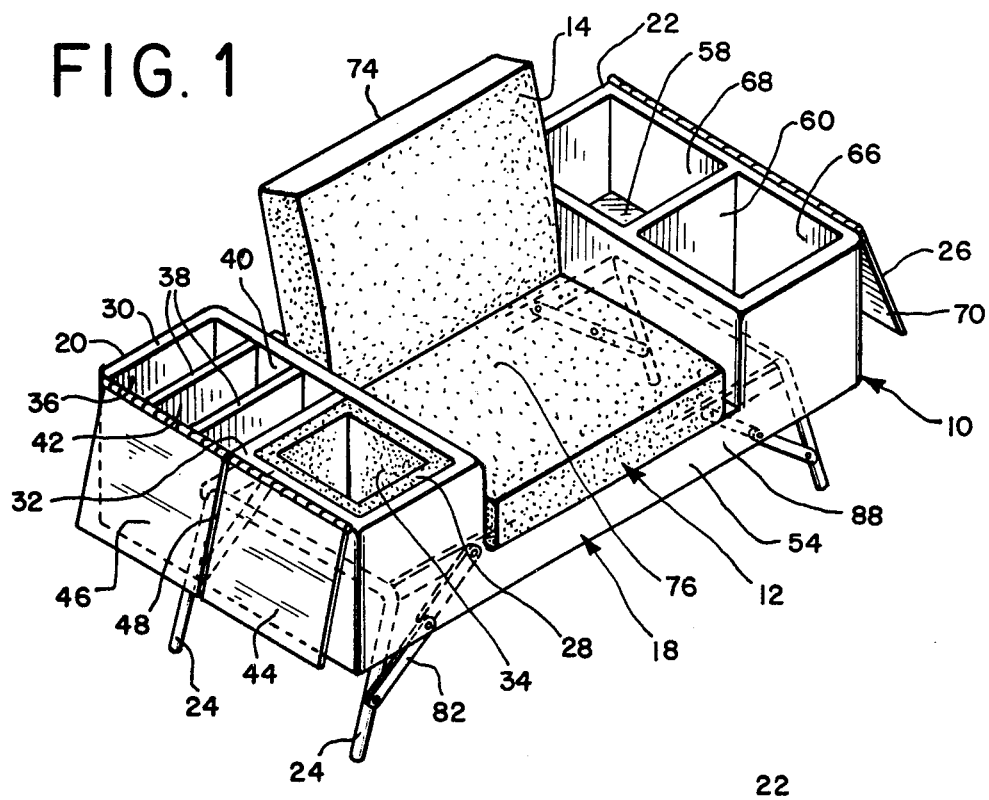

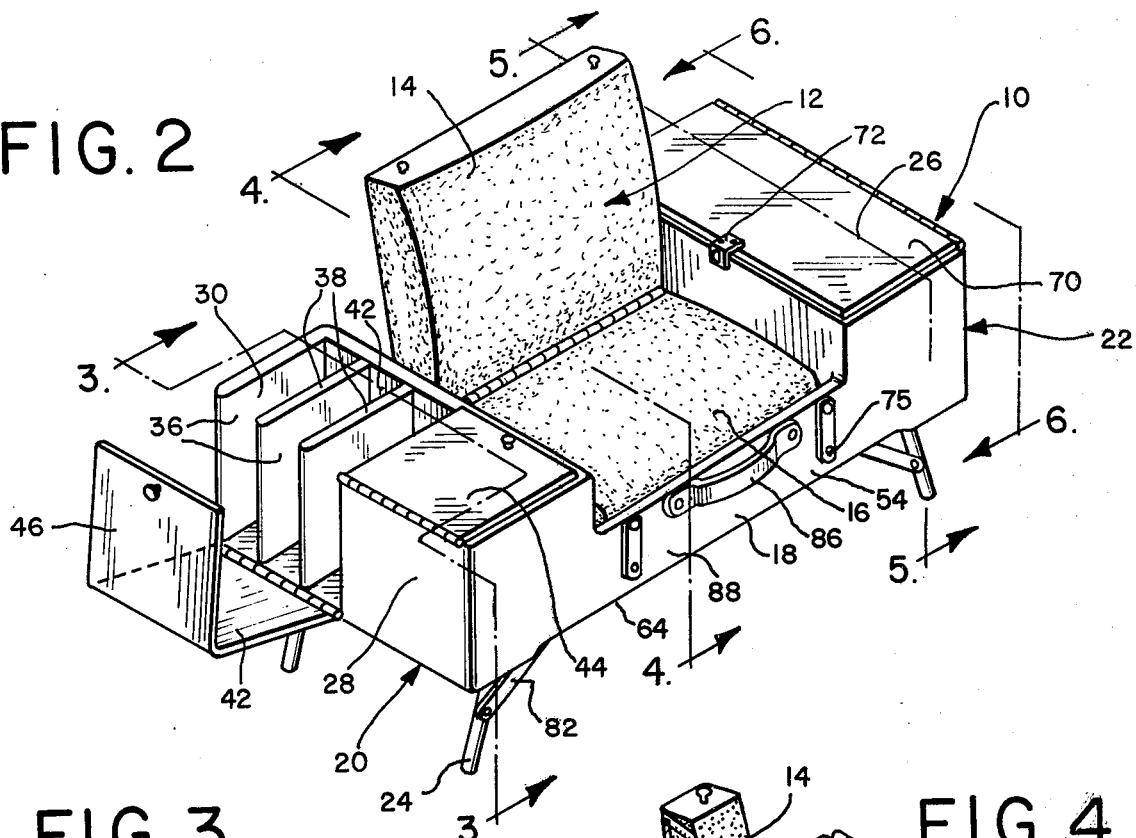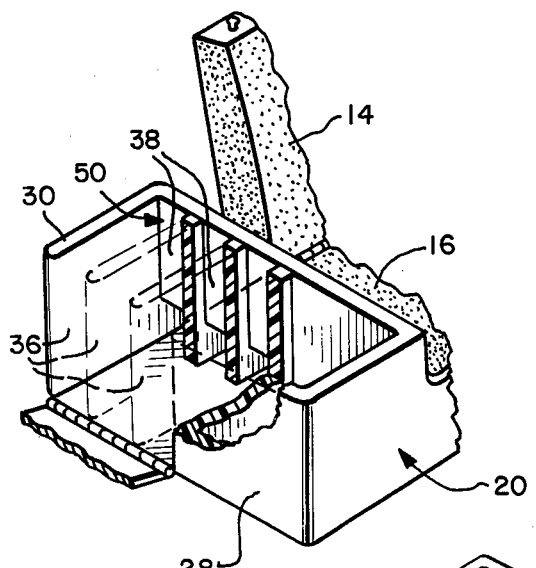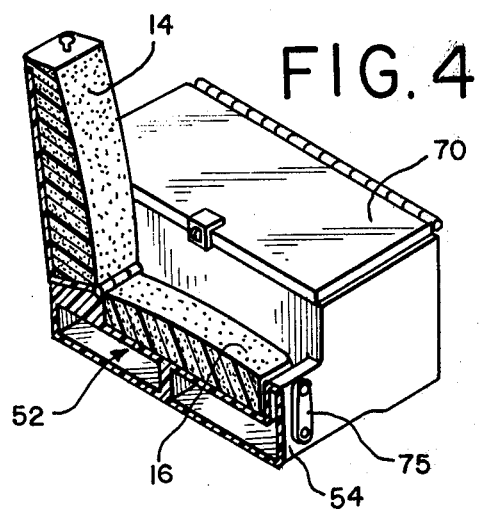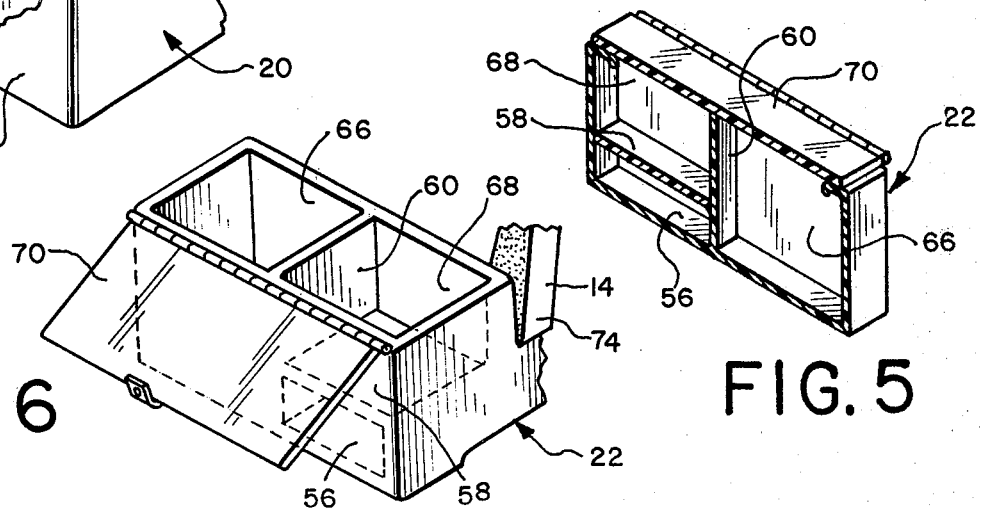

PORTABLE CHAIR AND STORAGE UNIT

BACKGROUND OF THE INVENTION

The present invention is directed to an improved chair and storage unit that can be compacted and easily transported from one place to another. The chair and storage unit is particularily suitable as a fishing seat, and for packing and storing fishing gear.

An adequate chair, which is also portable, is extremely useful to fishing enthusiasts. Typical folding chairs are generally clumsy to transport, even though they may be light in weight. Moreover, a given folding chair is not generally adaptable to the range of environments used by a fishing enthusiast, such as boats, river banks, and rocky shelves.

A fisherman has an additional need for convenient storage and transportation of his fishing gear, particularly fishing rods and reels. Transporting both a portable chair and separate storage containers for the fishing gear can present problems, particularly if this equipment is to be carried any distance on foot.

It is desirable to provide a portable chair and storage compartment for fishing gear in a single unitary structure. Some combinations of storage units and chairs are known in the art, such as those disclosed in U.S. Pat. Nos. 2,681,809 (Hamill), 3,545,809 (Krenz), and 2,357,214 (McDole). None of these combination units, however, provide adequate seating, such as not only both seat and back cushions, but also arm rests. These known combinations are designed either to rest directly on the ground or to be raised above ground by stationary legs, rather than being usable with or without supporting legs depending upon preference and environment. None of these known combinations provide adequate storage space for all necessary fishing gear, particularily fishing rods and reels. Further, when the seats of the known combinations are placed in operational positions, access to the storage areas is generally lost.

It is an object of the present invention to provide a portable combination of a chair and storage compartments in a single, unitary structure. it is an object to provide such combination with an adequate seat, including not only seat and back cushions, but also arm rests. It is the further object to provide this combination in a structure that can rest directly on the ground or be raised thereabove. It is an object to provide this combination wherein the storage areas are easily accessible when the seat is placed in an operational position. It is another object to provide adequate storage area for fishing gear including fishing rods and reels in a unitary structure combined with an adequate fishing chair.

SUMMARY OF THE INVENTION

The foregoing other objects are realized in accordance with the invention by providing, in combination, a seat, supported on a chair foundation, and upright storage compartments that flank the seat, in a unitary structure. The seat is formed of a bottom and a back cushion, disposed between side storage compartments, which serve as arm rests on side tables. The side compartments generally are enclosed with top lids that open away from the seat, allowing access to their contents by a person seated in the chair.

The combination preferably includes collapsible legs, secured to the foundation opposite the seat cushions. The legs can be used to raise the entire unit above ground level, should preference or environment dictate such use. Otherwise the unit can be placed directly on the ground without obstructing any of its functional features.

Multiple storage areas are preferably formed in the side compartments so that different equipment can be maintained separately. In a preferred embodiment, a storage area for rods is provided. This storage area extends from one side compartment, through a portion of the chair foundation beneath the seat cushions, to the opposite side compartment. The first side compartment is adapted to receive the rods, tip first, and has sufficient room for the more bulky reels. The rod storage area in the opposite side compartment may be separated from the remaining portion of the compartment by vertical and horizontal partitions, allowing storage of other equipment not only at its side, but also above it.

The invention and its objects, method of operation, features, and advantages will be more fully understood by reference to the following drawings and detailed description.

DESCRIPTION OF THE DRAWINGS

FIG. 1 is a perspective view of a chair and storage unit embodying the features of the present invention, with a portion of the underlying support means shown in phantom and the storage areas shown open;

FIG. 2 is a perspective view of the chair and storage unit of FIG. 1 with the storage areas shown partially closed;

FIG. 3 is an enlarged fragmentary perspective view of a side compartment of the chair and storage unit of FIG. 2;

FIG. 4 is an enlarged, fragmentary, cross-sectional view of the chair and storage unit of FIG. 2, taken along line 4—4 of FIG. 2;

FIG. 5 is an enlarged, fragmentary, cross-sectional view of the chair and storage unit of FIG. 2, taken along line 5—5 of FIG. 2;

FIG. 6 is an enlarged, fragmentary perspective view of the right side storage compartment of the chair and storage receptacle combination of FIG. 2, rotated 180 degrees from its position in FIG. 2; and FIG. 7 is a perspective view of the chair and storage unit combination of FIG. 1 shown compacted for handling, from the bottom.

DETAILED DESCRIPTION OF THE DRAWINGS

Referring now to the drawings, particularly FIG. 1, there is illustrated a chair and storage unit embodying the features of the present invention, indicated generally by the reference numeral 10. A chair seat, designated generally 12, is formed by a generally upright back cushion 14 and a bottom cushion 16 that overlies and is secured to a chair foundation, designated generally 18. The chair seat 12 is flanked by a first and second side compartments 20, 22 that form arm rests or side tables for the chair seat 12. The entire chair and storage unit 10 is shown raised above the ground by adjustable legs 24. The closures for the side compartments 20, 22 are top lids 26 that swing outwardly, away from the chair seat 12, so as to be accessible to a person seated therein. The chair and storage unit 10 provides adequate storage space for all equipment customarily used in fishing, as will be described in more detail below.

Referring now to FIG. 2 also, the first side compartment 20 is divided into a forward cooler storage area 28 and a rearward fishing reel storage area 30 by an upright partition 32. The cooler storage area 28 preferably includes an insulator lining 34 of a suitable insulation material, such as styrafoam or the like. The reel storage area 30 is divided into a series of reel compartments 36 by a plurality of internal separating partitions 38. In a preferred embodiment, these internal separating partitions 38 can be adjusted to provide reel compartments 36 of varying dimensions, such as by providing a plurality of vertical grooves (not shown) along the inner face of the side walls 40, 42 of the reel storage area 30, for separate access to these areas.

The top lids 26 generally are the same as the top lid 44 of the cooler storage area 28. The top lids 26 are hinged along the outer side top edges 48 of the chair and storage unit 10. For a given storage area, such as the cooler storage area 28, the lid 44 is hinged opposite the chair 12 and is swung outwardly, away from the chair seat 12, to open. Materials can be taken from and placed in the storage area by a seated person. A suitable latch or locking means is provided for each lid 26 so as to individually secure the storage area and the contents within. When the top lids 26 are closed, a person seated in the chair seat 12 is provided with convenient side arm rests or side tables.

Referring now to FIGS. 3, 4, and 5 also, the reel storage area 30 is the first portion of a fishing rod storage area, designated generally 50. The fishing rod storage area 50 includes the fishing reel storage area 30, an intermediate rod storage area 52 which is a hollow portion 54 in the chair foundation 18 below the bottom cushion 16, and a rod tip storage area 56 in the second side compartment 22. The rod tip storage area 56 is preferably completely closed off from the remaining portions of the second side compartment 22 by a overlying horizontal partition 58 and a portion of a vertical partition 60. Preferably, only the reel storage area 30 is subdivided, because it is the only portion of the fishing rod storage area that is readily accessible for adjustment, the remaining portions being completely enclosed to provide additional protection for the rods that will be stored within.

The fishing rod storage area 50 receives a fishing rod, tip first, through the reel storage area 30. To facilitate insertion of the entire rod through the reel storage area 30, the top lid 46 is hinged to an outer side wall 62 that is hinged to the bottom wall 64 of the foundation 18. The top and side of the reel storage area 30 can be completely exposed. A latch (not shown) can be provided at the rearward edge of the outer side wall 62 to lock it into a closed position so that the top lid 46 can be opened separately. Alternatively, the top lid 46 and the side wall 62 may be rigidly secured together or formed as one piece to provide a single angle enclosure for both the top and the side.

As mentioned above, the second side compartment 22 is divided by the vertical partition 60 into a forward compartment, a tackle compartment 66, and by both the vertical partition 60 and the horizontal partition 58 into a rearward compartment, a bait compartment 68. Each could be provided with a separate top lid 26, but as shown, they are preferably provided with a single second side compartment top lid 70, again hinged opposite the chair seat 12, and provided with a conventional latch 72 to secure its contents. The single top lid 70 allows easy access to both the tackle and the bait storage compartments 66, 68, which normally would be used simultaneously.

Referring now to FIG. 7 also, the bottom cushion 16 of the chair seat 12 is positioned below the tops of the side compartments 20, 22, providing the arm rest and side table functions of the side compartments 20, 22 at a convenient height. The back cushion 14 is adjustable from a supported upright, slightly backward slanting position to a compacted position overlying the bottom cushion 16 by conventional means. When the back cushion 14 is compacted to overlie the bottom cushion 16, the back face 74 of the back cushion 14 preferably is coplainer with the top lids 26 of the side compartments 20, 22, forming a flat side of the compacted chair and storage unit 10, as best shown in FIG. 7. The cushions 14, 16 are latched together in the compacted position, such as by latching means 75.

The adjustable legs 24 are preferably secured to a rectangular frame 76 that is secured to the bottom 78 of the chair and storage unit 10. Most preferably, the bottom wall 78 is provided with a recess 80 of sufficient depth to receive the legs 24. This preferred embodiment allows the chair and storage unit 10 to be placed directly on the ground for use without damage to the frame 76 or legs 24, when preference or the environment requires such use. The legs 24 are moveable inward so as to lie within the frame 76 or recess 80, and are provided with hinged struts 82 with locking nuts 84 to stablize and strengthen the legs 24 when in a raised position, supporting the chair and storage unit 10.

The chair and storage unit 10 may be provided with a handle 86, preferably on its forward edge 88, although other convenient placements for a handle are possible.

The chair foundation 18 and shells of the side compartments 20, 22 may be formed as a single piece of suitable material, such as plastic or the like. Alternatively, the storage compartments 20, 22 could be formed as separate structures and secured to the base portion 54 to form the foundation 18.

It will be understood that changes may be made in the details of construction, arrangement, and operation without departing from the spirit of the invention, particularly as defined in the following claims.

We claim:

1. A portable chair and storage unit, comprising, in combination:

a chair foundation, including a base segment flanked by a first and a second side compartment, wherein at least one of said side compartments has a top lid hingedly secured along the outer edge of said side compartment so as to open away from said chair seat;

a chair seat, including a bottom and a back cushion, said bottom cushion being supported on and secured to said base segment, and said back cushion being movable between a generally upright functional position, to a compacted position generally overlying said bottom cushion, said first and second side compartments being of a sufficient height to form a substantially planar surface with the back face of said back cushion when in said compacted position;

means for locking said back cushion in said compacted position to provide a readily portable unit when compacted;

further including at least one partition dividing at least one of said side compartments having a top lid into more than one storage areas; and wherein said first side compartment includes a fishing reel storage area having means for side-end opening, said fishing reel storage area having a means for side-end opening, said fishing reel storage area being in communication with a hollow portion of said base segment, below said bottom cushion, that is in communication with said second side compartment, said fishing reel storage area, base hollow portion, and second side compartment together forming a fishing rod storage area, whereby a portable chair and storage unit that allows access to side storage compartments including a storage area for fishing rods, both when the back cushion is in the upright and in the compacted position, is provided.

2. The portable chair and storage unit of claim 1 wherein said second storage compartment has a top opening and further includes a forward and a rear storage area, separated from each other by an upright wall, and at least one of said forward and rear compartments being separated from said second storage compartment portion of said fishing rod storage area by a horizontally extending wall, so as to enclose said second storage compartment portion of said fishing rod storage area from access through said top opening.

3. The chair and storage unit of claim 1 wherein said first side compartment further includes a cooler storage area, having a separate lid and an insulation lining.

4. The chair and storage unit of claim 3, further including means for supporting said unit in a raised position above the ground.

5. The chair and storage unit of claim 4 wherein said support means are legs, having means for bracing said legs when in said supportive position, and being foldable to lie adjacent the bottom wall of said foundation.

6. The chair and storage unit of claim 5 wherein said bottom wall of said foundation is recessed to receive said legs.

7. The chair and storage unit of claim 1 wherein said fishing reel storage area is divided into a plurality of fishing reel compartments by a plurality of spaced-apart upright partitions.

8. The chair and storage unit of claim 7 wherein said upright partitions are adjustable so as to vary the distance therebetween.

9. The chair and storage unit of claim 1 wherein said fishing reel storage area is enclosed by at least one angle lid, hinged along the bottom edge of said first side compartment so as to be swingable outwardly to expose the top and outer end of said fishing reel storage area.

* * * * *

UNITED STATES PATENT AND TRADEMARK OFFICE
CERTIFICATE OF CORRECTION

PATENT NO. : 4,191,420
DATED : March 4, 1980
INVENTOR(S) : Fassett et al.

It is certified that error appears in the above-identified patent and that said Letters Patent are hereby corrected as shown below:

Column 5, lines 1 and 2, delete the phrase "said fishing reel storage area having a means for side-end opening,"

Signed and Sealed this

*Twenty-eighth* Day of *October 1980*

[SEAL]

*Attest:*

*Attesting Officer*

SIDNEY A. DIAMOND

*Commissioner of Patents and Trademarks*